(12) United States Patent
Takenouchi et al.

(10) Patent No.: US 7,330,148 B2
(45) Date of Patent: Feb. 12, 2008

(54) MEASURING APPARATUS AND MEASURING METHOD

(75) Inventors: Shinya Takenouchi, Otsu (JP); Hoshibumi Ichiyanagi, Nara (JP); Yasuhiro Satoh, Otsu (JP)

(73) Assignee: Omron Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 11/726,858

(22) Filed: Mar. 23, 2007

(65) Prior Publication Data

US 2007/0222670 A1 Sep. 27, 2007

(30) Foreign Application Priority Data

Mar. 23, 2006 (JP) .............................. 2006-081259

(51) Int. Cl.
G01S 13/32 (2006.01)
G01S 13/38 (2006.01)

(52) U.S. Cl. .................. 342/127; 342/118; 342/70

(58) Field of Classification Search ................ 342/118, 342/127, 145, 70
See application file for complete search history.

(56) References Cited

U.S. PATENT DOCUMENTS

| | | | |
|---|---|---|---|
| 3,766,554 A | 10/1973 | Tresselt | |
| 4,134,114 A | 1/1979 | Riggs et al. | |
| 4,161,732 A | 7/1979 | Longuemare, Jr. | |
| 4,697,184 A | 9/1987 | Cheal et al. | |
| 4,846,571 A | 7/1989 | Jelalian et al. | |
| 5,339,084 A | 8/1994 | Watanabe et al. | |
| 7,095,363 B2 * | 8/2006 | Ishii et al. | .................. 342/70 |

FOREIGN PATENT DOCUMENTS

| | | |
|---|---|---|
| EP | 1 385 021 A2 | 1/2004 |
| GB | 1 403 515 A | 8/1975 |
| WO | WO-92/19980 | 11/1992 |
| WO | WO-2004/025322 A1 | 3/2004 |

OTHER PUBLICATIONS

European Search Report dated Jul. 3, 2007, issued in European Patent Application No. 071046789.0-2220, 8 pages.

* cited by examiner

*Primary Examiner*—Ian J. Lobo
(74) *Attorney, Agent, or Firm*—Osha·Liang LLP

(57) ABSTRACT

A measuring apparatus for measuring a distance from an object to be measured has, a transmitting means for alternately modulating amplitudes of a first continuous wave having a first frequency and a second continuous wave having a second frequency for transmitting a transmission signal as a carrier wave using an AM signal. The AM signal is produced by an AM producing circuit for modulating the amplitudes. The transmission signal is reflected as a reflection signal by the object to be measured and received by a receiving circuit. A first distance calculating circuit calculates the distance using a phase difference between the first and second continuous waves. A second distance calculating circuit is used for demodulating the receipt signal, detecting a phase difference, and calculating a distance from the object to be measured using the detected phase difference. A determining circuit determines a final distance measurement based on the above calculations.

4 Claims, 5 Drawing Sheets

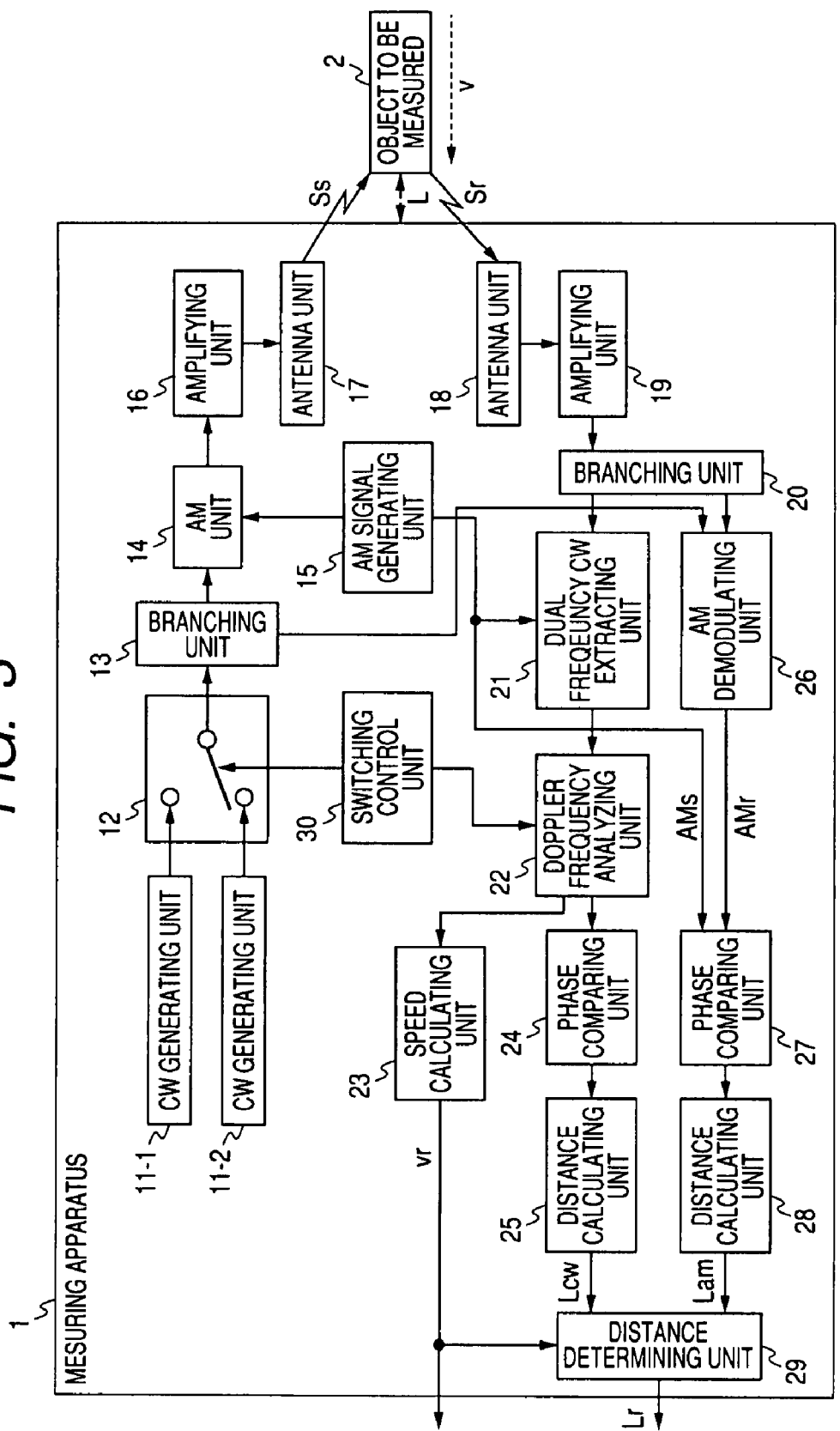

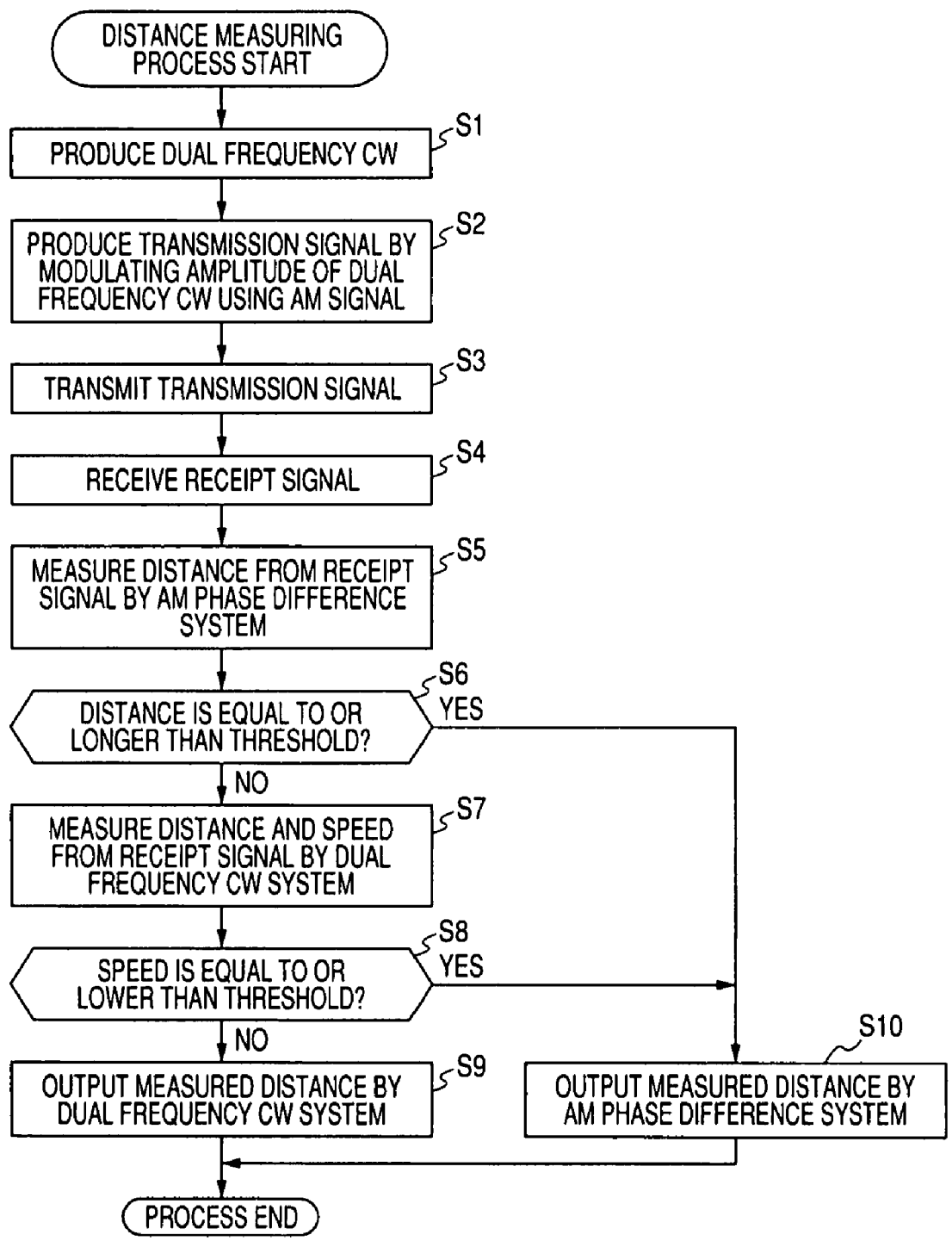

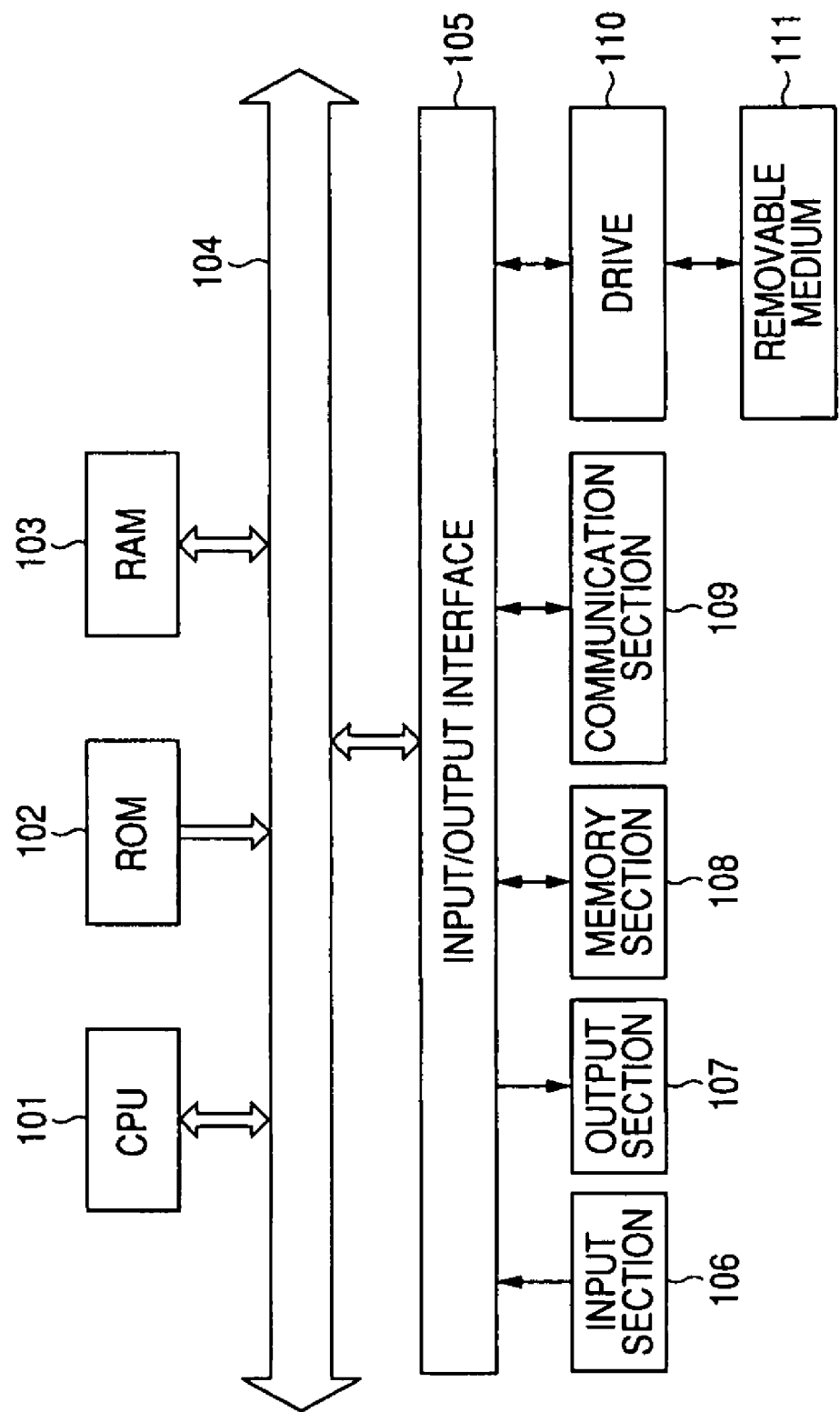

MEASURING APPARATUS AND MEASURING METHOD

BACKGROUND OF THE INVENTION

1. Field of the Invention

The present invention is related to a measuring apparatus and a measuring method, and more particularly to a measuring apparatus and a measuring method for improving the reliability of accurate distance measurement when a dual frequency continuous wave (CW) method is used.

2. Background Art

One example of a conventional sensor uses the dual frequency CW method to measures a relative speed and a distance between a vehicle to which the sensor is attached and another vehicle (see, e.g., Japanese Patent No. 3,203,600 and JP-A-2004-69693). This dual frequency CW method sensor detects a frequency of a Doppler signal and a phase of the Doppler signal produced for a received carrier wave, and uses the detected frequency and phase to measure the relative speed and distance between the vehicle to which the sensor is attached and another vehicle.

In the dual frequency CW method sensor, the distance cannot be measured when the relative speed is equal to zero.

In addition, when a relatively high-frequency noise is superposed on the carrier wave received by the dual frequency CW method sensor, the phase of the Doppler frequency varies due to the presence of the noise. These variations of the phase are small as viewed individually, but can produce large distance errors as the carrier wave also has a high frequency. Thus, in the dual frequency CW method sensor, distance measurement accuracy can decrease when relatively high-frequency noise is superposed on the carrier wave.

Accordingly, reliability of accurate distance measurement using the dual frequency CW method is low.

The conventional devices are characterized by a combination of a modulation method used in the dual frequency CW method and another modulation method (e.g., frequency pulse CW method or FM-CW method). The frequency pulse CW method measures a distance based on the delay time of a pulse. Thus, distance accuracy decreases when high-frequency noise is superposed on the carrier wave. The FM-CW method calculates a distance based on variation of frequency, that is, deviation of carrier wave frequency. Thus, distance accuracy is similarly affected by high-frequency noise superposed on the carrier wave.

SUMMARY OF THE INVENTION

In one or more embodiments of the present invention, a measuring apparatus for measuring at least a distance from an object to be measured comprises, a transmitting means for alternately modulating amplitudes of a first continuous wave having a first frequency and a second continuous wave having a second frequency. The transmitting means modulates amplitudes for transmitting a transmission signal as a carrier wave using an AM signal. Further, an AM producing means for producing the AM signal is used for modulating the amplitudes. A receiving means for receiving a reflection signal of the transmission signal transmitted from the transmitting means and reflected by the object to be measured as a receipt signal. A first distance calculating means for detecting a phase difference between a first Doppler signal for the first continuous wave and a second Doppler signal for the second continuous wave from the receipt signal received by the receiving means, and calculating a distance from the object to be measured according to a first method using the detected phase difference. A second distance calculating means for demodulating the receipt signal received by the receiving means into the AM signal, detecting a phase difference between the AM signal after demodulation and the AM signal produced from the AM producing means, and calculating a distance from the object to be measured according to a second method using the detected phase difference. A determining means for determining a final distance measurement result based on the distance calculated by the first distance calculating means and the distance calculated by the second distance calculating means.

In one or more embodiments of the present invention, the transmitting means comprises, for example, a first CW generating unit for generating the first CW having the first frequency, a second CW generating unit for generating the second CW having the second frequency, a switching unit for alternately switching the first CW and the second CW and outputting a dual frequency CW, a switching control unit for controlling switching timing of the switching unit, an AM unit for modulating the amplitude of the dual frequency Cw outputted from the switching unit, an amplifying unit for applying processing such as amplification to an output signal from the AM unit, and an antenna unit for transmitting an output signal from the amplifying unit by radio.

In one or more embodiments of the present invention, the AM producing means comprises, for example, an AM signal producing unit as a signal producing device for producing an AM signal used by the AM unit.

In one or more embodiments of the present invention, the receiving means comprises, for example, an antenna unit for receiving the receipt signal, and an amplifying unit for applying processing such as amplification to the receipt signal received by the antenna unit.

In one or more embodiments of the present invention, the first distance measuring means comprises, for example, an extracting unit for extracting dual frequency CW from the output signal produced by the amplifying unit, a Doppler frequency analyzing unit for analyzing the frequencies of the dual frequency CW to detect the phase of the first Doppler signal for the first CW and the phase of the second Doppler signal for the second CW, a phase comparing unit for obtaining the phase difference between the first Doppler signal and the second Doppler signal, and a distance calculating unit for calculating a distance based on the phase difference obtained by the phase comparing unit.

In other words, in one or more embodiments of the present invention, a dual frequency CW method sensor comprises, for example, the transmitting means, the AM producing means, the receiving means, and the first distance measuring means.

In one or more embodiments of the present invention, distance measurement using the dual frequency CW method can be performed by using the aforementioned means. In one or more embodiments of the present invention, the distance calculated by the first distance measuring means is equivalent to the distance measurement result obtained by the dual frequency CW method.

In one or more embodiments of the present invention, the second distance measuring means has an AM demodulating unit for demodulating the output signal from the amplifying unit into the AM signal, a phase comparing unit for obtaining a phase difference between the AM signal after demodulation and the AM signal produced from the AM signal producing unit, and a distance calculating unit for calculating a distance based on the phase difference obtained by the phase comparing unit.

In one or more embodiments of the present invention, the phase difference between the AM signals is independent of the relative speed and, thus, the second distance measuring means which uses the phase difference can measure the distance even when the relative speed between the measuring apparatus and the object to be measured is zero. Also, in one or more embodiments of the present invention, the frequencies of the AM signals are lower than the frequencies of the dual frequency CW as the carrier wave, that is, the first and second frequencies. Thus, according to the second distance measuring means which uses the low-frequency AM signals, distance errors caused by noise having a relatively high frequency and superposed on the carrier signal can be considerably reduced compared with distance errors in the case of the dual frequency CW method.

In one or more embodiments of the present invention, the determining means comprises, for example, a circuit for signal processing, a computer for executing signal processing as software, or others.

Thus, in one or more embodiments of the present invention, the determining means determines the distance as the final measurement result considering not only the distance calculated by the first distance measuring means which uses the dual frequency CW method, but also the distance calculated by the second distance measuring means which uses the phase difference between the AM signals. Accordingly, in one or more embodiments of the present invention, utilizing the dual frequency CW method may improve the reliability of accurate distance measurement.

In one or more embodiments of the present invention, the first distance calculating means further detects Doppler frequencies of the first Doppler signal and the second Doppler signal, and calculates a relative speed between the measuring apparatus and the object to be measured using at least one of the detected Doppler frequencies. In one or more embodiments of the present invention, the determining means determines the distance calculated by the second distance calculating means as the final measurement result when the relative speed calculated by the first distance calculating means is less than or equal to a threshold value, and determines the distance calculated by the first distance calculating means as the final measurement result when the relative speed exceeds the threshold value.

In one or more embodiments of the present invention, the structure of the determining means can be simplified. Thus, when the determining means comprises, for example, a circuit, the circuit scale can be reduced. When the determining means comprises, for example, a computer for executing software, the scale of software can be reduced.

In one or more embodiments of the present invention, the transmitting means has one system that alternately and continuously modulates the amplitudes of the first CW and the second CW for transmitting a transmission signal as a continuous carrier wave.

In one or more embodiments of the present invention, when the dual frequency CW method is used, frequency modulation is not carried out since the frequency is already varied. Thus, only the amplitude is continuously modulated during alternate transmission of two frequencies. Accordingly, the transmitting means can continuously apply modulation while alternately transmitting two frequencies. More specifically, at the relative speed of around zero between the measuring apparatus and the object to be measured, the frequency pulse CW method or the FM-CW method co-used as in conventional sensors requires transmission antennas and the like for two systems. However, the measuring apparatus, in accordance with one or more embodiments of the present invention, needs only a transmission antenna for one system.

In one or more embodiments of the present invention, a method of a measuring apparatus for measuring at least a distance from an object to be measured, comprising the following steps: alternately modulating amplitudes of a first continuous wave having a first frequency and a second continuous wave having a second frequency for transmitting a transmission signal as a carrier wave using an AM signal; receiving a reflection signal of the transmission signal reflected by the object to be measured as a receipt signal; detecting a phase difference between a first Doppler signal for the first continuous wave and a second Doppler signal for the second continuous wave from the receipt signal; calculating a distance from the object to be measured according to a first method using the detected phase difference; demodulating the receipt signal into the AM signal, detecting a phase difference between the AM signal after demodulation and the AM signal used for the amplitude modulation, calculating a distance from the object to be measured according to a second method using the detected phase difference; and determining a final distance measurement result based on the distance calculated according to the first method and the distance calculated by the second method.

In one or more embodiments of the present invention, using the dual frequency CW method may increase the reliability of accurate distance measurement.

Accordingly, distance measurement using the dual frequency CW method can be executed in one or more embodiments of the present invention. Particularly, one or more embodiments of the present invention may improve the reliability of accurate measurement.

BRIEF DESCRIPTION OF DRAWINGS

FIG. 3 is a block diagram of a measuring apparatus in accordance with one or more embodiments of the present invention.

FIG. 4 is flow diagram in accordance with FIG. 3.

FIG. 5 shows a block diagram of a measuring apparatus in accordance with one or more embodiments of the present invention.

DETAILED DESCRIPTION

Figure 1:
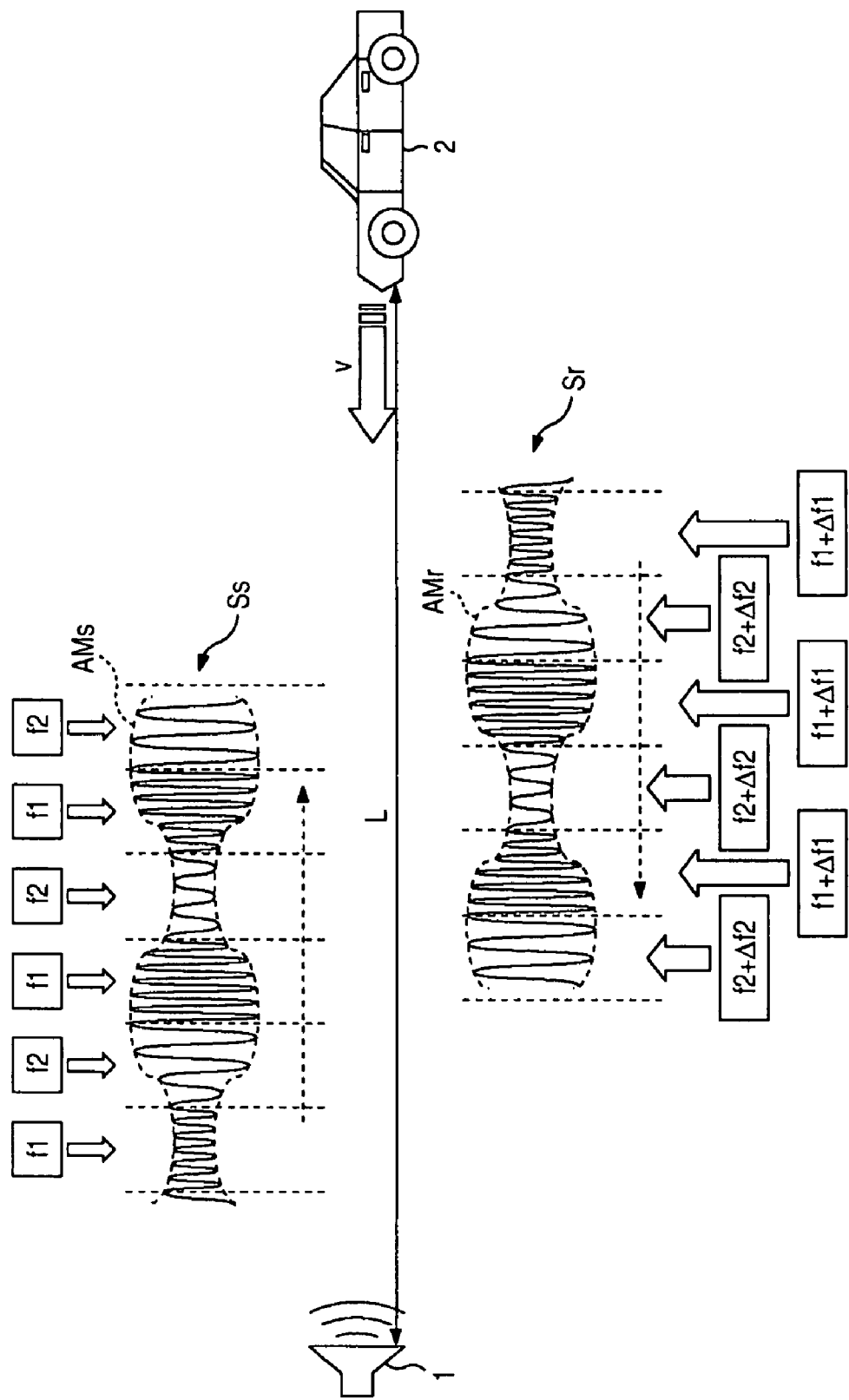
FIG. 1 illustrates a dual frequency CW method.
Figure 2:
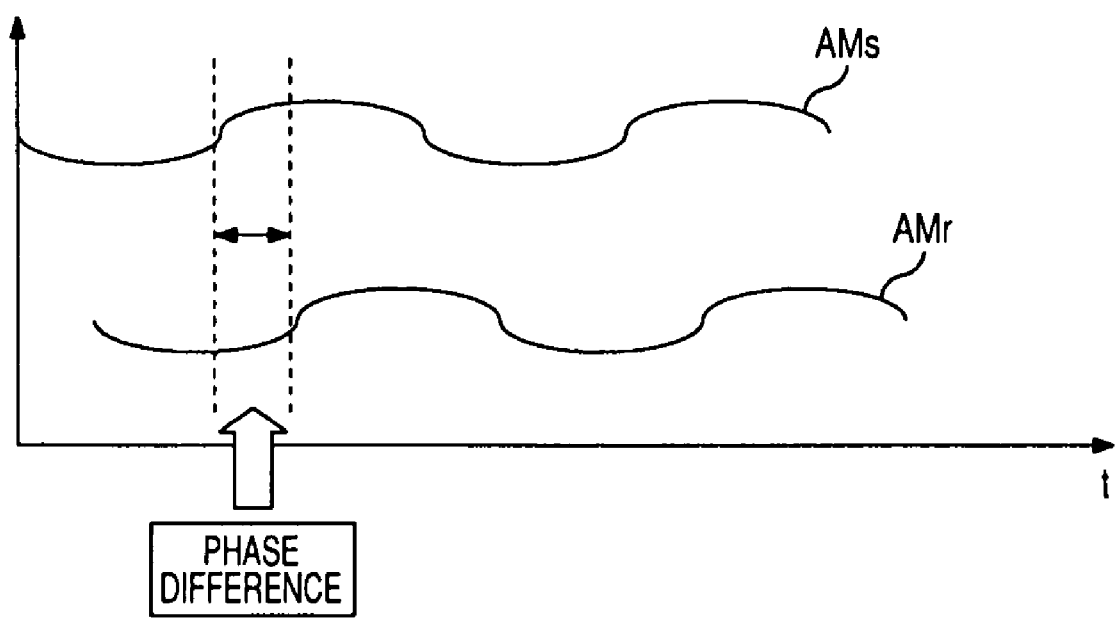
FIG. 2 shows an AM phase difference method in accordance with one or more embodiments of the present invention.

In order to facilitate an understanding of the present invention, an example of a sensor previously invented by the inventors of the present invention is explained at the outset, with reference to FIGS. 1 and 2.

Referring initially to FIG. 1, distance is measured by using the dual frequency CW method. FIG. 1 shows a measuring apparatus 1 for producing a signal obtained by switching a CW having a frequency f1 and a CW having a frequency f2 based on time division (hereinafter "dual frequency CW") as a carrier wave. Further, the measuring apparatus 1 modulates the amplitude of the dual frequency CW using an AM signal, and outputs the signal obtained by the amplitude modulation as a transmission signal Ss. Thus, the transmission signal Ss has two frequencies f1 and f2.

The transmission signal Ss is reflected by an object to be measured 2, and the reflection signal is received by the measuring apparatus 1 as a receipt signal Sr.

When there is a relative speed v between the measuring apparatus 1 and the object 2, Doppler frequencies $\Delta f1$ and $\Delta f2$ are produced for the frequencies f1 and f2 of the transmission signal Ss, respectively. Thus, the receipt signal Sr has frequencies $f1+\Delta f1$ and $f1+\Delta f2$. In other words, the signal obtained by modulating the amplitude of the dual frequency CW having the two frequencies, $f1+\Delta f1$ and $f1+\Delta f2$, by using the AM signal is equivalent to the receipt signal Sr.

Thus, the measuring apparatus 1 detects the Doppler frequency $\Delta f1$ or $\Delta f2$ from the receipt signal Sr using the following equation, (1) or (2), to calculate the relative speed v between the measuring apparatus 1 and the object 2:

$$v = c*\Delta f1/(2*f1) \quad (1)$$

$$v = c*\Delta f2/(2*f2) \quad (2)$$

where c is speed of light.

The measuring apparatus 1 also detects a phase $\Delta\phi 1$ of the Doppler signal having the Doppler frequency $\Delta f1$ and a phase $\Delta\phi 2$ of the Doppler signal having the Doppler frequency $\Delta f2$ from the receipt signal Sr and uses the following equation (3) to calculate a distance L between the measuring apparatus 1 and the object 2.

$$L = c*(\Delta\phi 1 - \Delta\phi 2)/4\pi*(f1-f2) \quad (3)$$

The distance measurement calculated by the equation (3) corresponds to the distance measurement using the dual frequency CW method.

The above equations (1) and (2) can be modified into the following equations (4) and (5), respectively:

$$\Delta f1 = 2*v*f1/c \quad (4)$$

$$\Delta f2 = 2*v*f2/c \quad (5)$$

As obvious from the equations (4) and (5), when the relative speed v between the measuring apparatus 1 and the object 2 is equal to zero, both the Doppler frequencies $\Delta f1$ and $\Delta f2$ become equal zero. In this case, it is impossible to obtain the phase $\Delta\phi 1$ for the Doppler frequency $\Delta f1$ and the phase $\Delta\phi 2$ for the Doppler frequency $\Delta f2$, and, thus, impossible to calculate the distance between the measuring apparatus 1 and the object 2. Thus, the present inventors developed the following distance measuring method.

Referring now to FIG. 2, a phase difference is produced between an AM envelope AMs of the transmission signal Ss and an AM envelope AMr of the receipt signal Sr according to a reciprocating distance of a radio wave, that is, according to the distance L between the measuring apparatus 1 and the object 2. The phase difference between the AM envelopes, AMs and AMr, is independent of the relative speed v between the measuring apparatus 1 and the object 2. Thus, the measuring apparatus 1 can use the phase difference between the AM envelopes, AMs and AMr, and obtain the distance L between the measuring apparatus 1 and the object 2 regardless of the relative speed v. Said another way, even when the relative speed v is equal to zero, the measuring apparatus 1 can obtain the distance L using the phase difference between the AM envelopes, Ams and Amr. This is the method developed by the present inventors, and is hereinafter referred to as the AM phase difference method to be distinguished from the dual frequency CW method discussed above.

Specifically, in accordance with the AM phase difference method, the following equation (6) is used to calculate the distance L between the measuring apparatus 1 and the object 2.

$$L = \{(c/fAM)*(\Delta\phi AM/360)\}/2 \quad (6)$$

In the above equation (6), fAM is a frequency of the AM envelope AMs of the transmission signal Ss, and the AM envelope AMr of the receipt signal Sr. Further, c is equal to the speed of light, and $\Delta\phi AM$ is equal to a phase difference, as shown in FIG. 2, between the AM envelope AMs of the transmission signal Ss and the AM envelope AMr of the receipt signal Sr.

In accordance with the AM phase difference method, an AM envelope having a lower frequency than the CW as a high-frequency carrier wave, for example, approximately 1 MHz, may be used. Thus, even when noise having a relatively high frequency is superposed on the receipt signal Sr, distance calculation errors caused by the noise are considerably reduced in comparison to distance calculation errors that may be caused when using the dual frequency CW method. Thus, the AM phase difference method may improve accuracy of distance measurement.

However, when the frequency of the AM envelope used in the AM phase difference method is lower than the frequency of the CW as a high-frequency carrier wave, the resolution of the AM phase difference method may be lower than that of the dual frequency CW method.

Specifically, utilization of the dual frequency CW method may have a higher resolution than utilization of the AM phase difference method, but the distance measurement may be affected by environmental changes, for example, when relative speed v is equal to zero or when noise is superposed. In other words, the reliability of accurate distance measurement may be low when using the dual frequency CW method.

In contrast, utilization of the AM phase difference method may have a lower resolution than utilization of the dual frequency CW method, but the distance measurement may not be affected by environmental changes, for example, when relative speed v is equal to zero or when noise is superposed. Thus, the reliability of accurate distance measurement may be high when using the AM phase difference method. However, the AM phase difference method may have low resolution.

Thus, the present inventors have developed the following distance measuring method for improving the reliability of the accurate distance measurement using the dual frequency CW method when attention is paid to the dual frequency CW method.

The present inventors further developed a method for determining a final distance measurement result (hereinafter "Lr") based on a distance (hereinafter "Lcw") calculated according to the dual frequency CW method and a distance (hereinafter "Lam") calculated according to the AM phase difference method. The aforementioned method that uses the distances Lcw and Lam is hereinafter referred to as the dual frequency CW and AM phase difference method.

In accordance with the dual frequency CW and AM phase difference method, the method for determining the distance Lr may be any method provided that the requirement that both of the distances, Lcw and Lam, are used.

Specifically, in the case of the dual frequency CW method, the relative speed v between the measuring apparatus 1 and the object 2 can be measured as discussed above. It is therefore possible, as an example of the determining method, to determine the distance Lam as the distance Lr when the relative speed v is a threshold value or lower, and determine the distance Lcw as the distance Lr when the relative speed v exceeds the threshold value. In this case, the distance Lr can be outputted independent of the relative speed v, that is, even when the relative speed v is equal to zero.

Also, in one example, a determining method which corrects the distance Lcw using the distance Lam and outputs the corrected result as the distance Lr can be adopted. In this case, when noise is superposed on the receipt signal Sr, that is, when noise is superposed on the carrier wave within a circuit of measuring apparatus 1, or when noise is superposed in the space between the measuring apparatus 1 and the object 2, distance errors caused by the noise can be reduced.

It is also possible to adopt such a determining method which outputs the distance Lr equivalent to the distance Lcw calculated by using the distance Lam having been obtained in advance, for example. In this case, the processing speed for outputting the distance Lr can be increased.

It is further possible to combine two or more of the determining methods shown above.

FIG. 3 shows an example of a measuring apparatus 1 which uses the dual frequency CW and AM phase difference method developed by the present inventors as explained above. Thus, FIG. 3 shows an example structure of the measuring apparatus according to one or more embodiments of the present invention.

The measuring apparatus 1 shown in FIG. 3 includes components from a CW generating unit 11-1 to a switching control unit 30.

The CW generating unit 11-1 generates a CW having the frequency f1 (as shown in FIG. 1), for example, and supplies this CW to a switching unit 12. A CW generating unit 11-2 generates CW having the frequency f2 (as shown in FIG. 1), for example, and supplies this CW to the switching unit 12.

The switching unit 12 alternately switches between the CW having the frequency f1 generated from the CW generating unit 11-1 and the CW having the frequency f2 generated from the CW generating unit 11-2 under the control of the switching control unit 30 to output dual frequency CW having the frequencies f1 and f2 to the branching unit 13.

The branching unit 13 supplies the dual frequency CW received from the switching unit 12 to an AM unit 14 and an AM demodulating unit 26.

The AM unit 14 modulates the amplitude of the dual frequency CW supplied from the branching unit 13 using an AM signal produced from an AM signal generating unit 15, and supplies the modulated dual frequency CW to an amplifying unit 16. The amplifying unit 16 applies various appropriate processing, such as amplification to the amplitude-modulated dual frequency CW, and then supplies the resulting signal to an antenna unit 17 as an output signal. The output signal supplied from the amplifying unit 16 is outputted as the transmission signal Ss (as shown in FIG. 1) in the form of a radio wave.

The transmission signal Ss is reflected by the object 2, and the reflection signal is received by an antenna unit 18 as the receipt signal Sr (as shown in FIG. 1).

In the embodiment shown in FIG. 3, the antenna unit 17 for transmission and the antenna unit 18 for receipt are separately provided. However, only one common antenna unit for both transmission and receipt may be equipped.

An amplifying unit 19 applies various appropriate processing, such as amplification to the receipt signal Sr received by the antenna unit 18, and then supplies the resulting signal to a branching unit 20 as an output signal.

The branching unit 20 supplies the output signal received from the amplifying unit 19 to a dual frequency CW extracting unit 21 and the AM demodulating unit 26.

The dual frequency CW extracting unit 21 extracts a dual frequency CW from the output signal supplied from the amplifying unit 19 using the AM signal produced from the AM signal generating unit 15, and supplies the extracted dual frequency CW to a Doppler frequency analyzing unit 22.

As described with reference to FIG. 1, the dual frequency CW extracted by the dual frequency CW extracting unit 21 has the frequency f1+Δf1 and the frequency f2+Δf2. Thus, the dual frequency CW is sequentially outputted from the dual frequency CW extracting unit 21, such that the CW having the frequency f1+Δf1 and the CW having the frequency f2+Δf2 are alternately switched on the time division basis.

Further, the Doppler frequency analyzing unit 22 separates the CW having the frequency f1+Δf1 and the CW having the frequency f2+Δf2 from each other based on the switch timing of the switching unit 12 under the control of the switching control unit 30.

Subsequently, the Doppler frequency analyzing unit 22 applies processing such as FFT (fast Fourier transform) analysis to the CW having the frequency f1+Δf1 to detect the Doppler frequency Δf1 and its phase $\phi 1$. The Doppler frequency analyzing unit 22 then supplies the Doppler frequency Δf1 to a speed calculating unit 23, and supplies the phase $\phi 1$ to a phase comparing unit 24.

Similarly, the Doppler frequency analyzing unit 22 applies processing such as FFT analysis to the CW having the frequency f2+Δf2 to detect the Doppler frequency Δf2 and its phase $\phi 2$. The Doppler frequency analyzing unit 22 then supplies the Doppler frequency Δf2 to the speed calculating unit 23, and supplies the phase $\phi 2$ to the phase comparing unit 24.

The speed calculating unit 23 calculates the above equation (1) using the Doppler frequency Δf1 supplied from the Doppler frequency analyzing unit 22, or calculates the above equation (2) using the Doppler frequency Δf2 supplied from the Doppler frequency analyzing unit 22. Further, the speed calculating unit 23 outputs the calculation result to the outside and supplies the calculation result to a distance determining unit 29 as a relative speed vr (referred to as vr due to the possibility that the speed contains errors from the actual relative speed v) between the measuring apparatus 1 and the object 2.

The phase comparing unit 24 obtains the difference between the phase $\phi 1$ and the phase $\phi 2$ supplied from the Doppler frequency analyzing unit 22, that is, the phase difference $\phi 1-\phi 2$, and supplies the phase difference $\phi 1-\phi 2$ to a distance calculating unit 25. The distance calculating unit 25 then utilizes the above mentioned equation (3) using the phase difference $\phi 1-\phi 2$, and supplies the calculated result to the distance determining unit 29 as the distance Lcw.

According to the example shown in FIG. 1, therefore, distance measurement and relative speed measurement using the dual frequency CW method are executed chiefly by the sections from the dual frequency CW extracting unit 21 to the distance calculating unit 25.

On the other hand, according to the example shown in FIG. 1, distance measurement using the AM phase difference method is executed chiefly by the sections from the AM demodulating unit 26 to the distance calculating unit 28.

Specifically, the AM demodulating unit 26 demodulates the output signal outputted from the amplifying unit 19 into the AM signal using the dual frequency CW supplied from the branching unit 13, and supplies the AM signal to the phase comparing unit 27.

In this case, the AM signal produced from the AM demodulating unit 26 is inputted to the phase comparing unit 27 as the signal indicating the AM envelope AMr of the receipt signal Sr (as shown in FIG. 2, hereinafter abbreviated as AM signal AMr without distinction from the AM envelope). On the other hand, the AM signal produced from the AM signal producing unit 15 is inputted to the phase comparing unit 27 as the signal indicating the AM envelope AMs of the transmission signal Ss (as shown in FIG. 2, hereinafter abbreviated as AM signal AMs without distinction from the AM envelope). Further, the phase comparing section 27 calculates the phase difference $\Delta\phi AM$ between the AM signal AMs from the AM signal producing unit 15 and the AM signal AMr from the AM demodulating unit 26, and supplies the phase difference $\Delta\phi AM$ to the distance calculating unit 28. The distance calculating unit 28 utilizes the above equation (6) using the phase difference $\Delta\phi AM$, and supplies the calculated result to the distance determining unit 29 as the distance Lam.

By this method, the distance Lcw as the measurement result by the dual frequency CW method is supplied from the distance calculating unit 25 to the distance determining unit 29, and the distance Lam as the measurement result by the AM phase difference method is supplied from the distance calculating unit 28 to the distance determining unit 29. Further, the distance determining unit 29 determines the distance Lr as the final measurement result based on the distances Lcw and Lam, and outputs the distance Lr to the outside.

The method for determining the distance Lr by using the distance determining unit 29 may be any method provided that the requirement that both the distances Lcw and Lam are used is satisfied, as discussed above.

Specifically, according to the example shown in FIG. 1, the relative speed vr is supplied from the speed calculating unit 23. Thus, as discussed above, the distance determining unit 29 can output the distance Lam to the outside as the distance Lr when the relative speed vr is a threshold value or lower, and output the distance Lcw to the outside as the distance Lr when the relative speed vr exceeds the threshold value. A series of processes for measuring the distance according to this determining method (the series of processes for measuring the distance are hereinafter referred to as distance measuring process) are shown in the flow diagram in FIG. 4.

In step S1 in FIG. 4, the measuring apparatus 1 produces a dual frequency CW. As discussed above, the process in step S1 is executed chiefly by the sections from the CW generating unit 11-1 to the switching unit 12 and the switching control unit 30.

In step S2, the measuring apparatus 1 produces the transmission signal Ss by modulating the amplitude of the dual frequency CW using the AM signal. Further, the measuring apparatus 1 transmits the transmission signal Ss in step S3. As discussed above, the processes in steps S2 and S3 are executed chiefly by the sections from the AM unit 14 to the antenna unit 17.

The transmission signal Ss transmitted in the above process of step S3 is reflected by the object to be measured 2, and the measuring apparatus 1 receives the reflection signal as the receipt signal Sr in step S4. As discussed above, the process in step S4 is executed chiefly by the antenna unit 18 and the amplifying unit 19.

In step S5, the measuring apparatus 1 measures the distance Lam based on the receipt signal Sr using the AM phase difference method. As discussed above, the process in step S5 is executed chiefly by the sections from the AM demodulating unit 26 to the distance calculating unit 28.

In step S6, the measuring apparatus 1 judges whether the distance Lam is a threshold value or longer. The process in step S6 is executed chiefly by the distance determining unit 29.

In step S10, when it is determined that the distance Lam is the threshold value or longer in step 6, the measuring apparatus 1 outputs the distance measured by the AM phase difference method in step S6. Thus, the distance Lam is outputted as the distance Lr in step S10. After execution of step S10, the distance measuring process ends. The process in step S1 is also executed chiefly by the distance determining unit 29.

According to this embodiment, therefore, the final distance measurement result Lr of the measuring apparatus 1 is supplied to a not-shown different device which executes an operation for avoiding collision with another vehicle as the object to be measured 2 (hereinafter referred to as collision avoiding operation). Then, the different device judges whether the collision avoiding operation is to be executed or not based on the distance Lr. More specifically, when the distance Lr is long, the different device judges that the collision avoiding operation is not to be executed because of the low possibility of collision with the other vehicle. When the distance Lr is short, the different device judges that the collision avoiding operation is to be executed because of the high possibility of collision with the other vehicle.

When the distance Lr is long, high accuracy of the distance Lr is not required, that is, some errors are allowed to be contained in the distance Lr. Thus, when it is determined in step S6 that the distance Lam obtained by the AM phase difference method is the threshold or longer, that is, when the distance Lam is long, the measuring apparatus 1 supplies the distance Lam to the different device which executes the collision avoiding operation as the distance Lr to reduce the processing load applied to the measuring apparatus 1. In other words, according to this embodiment, the distance calculating unit 29 of the measuring apparatus 1 prohibits operations of the sections from the dual frequency CW extracting unit 21 to the distance calculating unit 25 and others so as to output the distance Lam measured by the AM phase difference method as the distance Lr, though this prohibiting process is not shown in FIG. 3. As a result, the processing load applied to the measuring apparatus 1 can be reduced.

On the other hand, when it is determined that the distance Lam is shorter than the threshold value in step S6, it is determined that the other vehicle is approaching the range having the possibility that the collision avoiding operation is to be executed. Thus, the process in step S7 and the subsequent steps are executed as follows.

The measuring apparatus 1 calculates the distance Lcw and the relative speed vr from the receipt signal Sr using the dual frequency CW method in step S7. As discussed above, the process in step S5 is executed chiefly by the sections from the dual frequency CW extracting unit 21 to the distance calculating unit 25. In other words, when it is determined that the distance Lam is shorter than the threshold value in step S6, prohibition of the operation by the sections from the dual frequency CW extracting unit 21 to the distance calculating unit 25 is cancelled and the process in step S7 is executed.

In step S8, the measuring apparatus 1 judges whether the relative speed vr is the threshold value or lower.

When it is determined that the relative speed vr is not the threshold value or lower, that is, the relative speed vr exceeds the threshold value in step S8, the measuring apparatus 1 outputs the distance measured by the dual frequency CW method in step S7 according to the process in step S9. Thus, the distance Lcw is outputted as the distance Lr in step S9. After completion of the process in step S9, the distance measuring process ends.

On the other hand, when it is determined that the relative speed vr is the threshold value or lower in step S8, the measuring apparatus 1 outputs the distance measured by the AM phase difference method in step S5 according to the process in step S10. Thus, the distance Lam is outputted as the distance Lr in step S10. After completion of the process in step S10, the distance measuring process ends.

As discussed above, the steps from S8 to S10 are performed chiefly by the distance determining unit 29.

According to the example of the distance measuring process in FIG. 4, it is assumed that the distance Lr produced from the measuring apparatus 1 is supplied to the different device which executes the collision avoiding operation. Thus, the judging process of step S6 is included in the distance measuring process. However, the distance Lr produced from the measuring apparatus 1 can be used for other various applications, and the judging process in step S6 is not essential depending on the types of applications. Also, the object to be judged in the process in step S6 is not limited to the distance, but may be other objects such as an approaching speed between the vehicle containing the measuring apparatus 1 and the other vehicle, that is, the relative speed Vr, or may be combinations of two or more objects.

Another example of the applications of the distance Lr produced from the measuring apparatus 1 includes an operation for running while keeping a constant distance between the vehicle containing the measuring apparatus 1 and the other vehicle, that is, so-called convoy running. Since this operation is basically aimed at running such that the relative speed Vr becomes zero, the distance Lr outputted from the measuring apparatus 1 can be appropriately used.

The series of the processes (or a part of the processes) discussed above can be executed not only by hardware, but also by software.

In this case, the measuring apparatus or a part thereof which performs the series of the processes can be constituted by a computer shown in FIG. 5, for example.

As shown in FIG. 5, a CPU (central processing unit) 101 executes various processes under a program recorded on a ROM (read only memory) 102, or a program loaded to a RAM (random access memory) 103 from a memory section 108. The RAM 103 also stores data necessary for executing various processes by using the CPU 101.

The CPU 101, the ROM 102, and the RAM 103 are connected with one another through a bus 104. An input/output interface 105 is also connected with the bus 104.

An input section 106 having components such as a keyboard and a mouse, an output section 107 having components such as a display, the memory section 108 having components such as a hard disk, and a communication section 109 having components such as a modem and a terminal adaptor are connected with the input/output interface 105. The communication section 109 communicates with another device through a network which may include the Internet. The communication section 109 also transmits and receives the transmission signal Ss and the receipt signal Sr used for measuring the object to be measured 2 shown in FIG. 1.

A drive 110 is connected with the input/output interface 105 as necessary. A removable medium 111 such as a magnetic disk, an optical disk, a photo-electromagnetic disk, and a semiconductor memory is appropriately attached to the drive 110. A computer program read from the removable medium 111 is installed in the memory section 108 as necessary.

When the series of processes are executed by software, a program constituting the software is installed from a network or a recording medium into a computer incorporated in dedicated hardware or a computer such as a general-purpose personal computer which executes various functions after various programs are installed, for example.

The recording medium including this program includes the removable medium 111 (package medium), such as a magnetic disk (including a floppy disk), an optical disk (including a CD-ROM (compact disk read only memory) and a DVD (digital versatile disk), a photo-electromagnetic disk (including an MD (mini-disk)), and a semiconductor memory, all of which are distributed to the user to supply the program separately from the apparatus main body as shown in FIG. 5, but also by the ROM 102 storing the program, a hard disk included in the memory unit 108 and others, all of which are supplied to the user as a unit already incorporated in the apparatus main body, in accordance with one or more embodiments of the present invention, in advance.

The steps for describing the program recorded in the recording medium in this specification include not only processes executed in the order according to time series, but also processes performed in parallel or individually regardless of time series.

Therefore, according to the dual frequency CW and AM phase difference method of one or more embodiments of the present invention, distance measurement is executed using the combination of the dual frequency CW method and the AM phase difference method. In this case, the distance can be measured even when the relative speed between the measuring apparatus and the object to be measured is zero, and distance errors caused by noise having a relatively high frequency and superposed on the carrier signal can be considerably reduced in comparison with the measuring apparatus in the conventional art, as discussed above.

Thus, in accordance with one or more embodiments of the present invention, the measuring apparatus uses the dual frequency CW and AM phase difference method. Unlike the conventional apparatus that uses the FM-CW method, the measuring apparatus according to one or more embodiments of the present invention may eliminate the necessity for improvement over the generating units. Thus, the circuit does not become complicated.

The manufacturing cost of the measuring apparatus according to one or more embodiments of the present invention may be reduced compared with the cost of the conventional art measuring apparatus using the FM-CW method. The generating units capable of securing linearity of frequency modulation in the FM-CW method are costly, but such expensive generating units are not required for the measuring apparatus of one or more embodiments of the present invention. Additionally, the structure of the circuit part of the AM phase difference method can be simplified when its demodulation circuit is simply constituted by a diode or the like. Thus, the manufacturing cost of the circuit part is lower than that of apparatuses using other methods.

When the dual frequency CW method is used, frequency modulation is not carried out since the frequency is already varied. Thus, only the amplitude is continuously modulated during alternate transmission of two frequencies. Accordingly, the measuring apparatus according to one or more embodiments of the present invention can continuously apply modulation while alternately transmitting two frequencies. Specifically, at the relative speed of around zero between the measuring apparatus and the object to be measured, the frequency pulse CW method or the FM-CW method co-used as in conventional apparatuses, requires transmission antennas and the like for two systems. However, the measuring apparatus according to one or more embodiments of the present invention needs only a transmission antenna for one system.

The pulse modulation using the dual frequency CW method has a outputting time that is shorter than that of the amplitude modulation, which decreases the processing opportunities and prolongs the processing time. However, lowering of the output level of the amplitude modulation is prevented to some extent except in the case of 100% modulation. Thus, the amplitude modulation is superior to the pulse modulation. Accordingly, the measuring apparatus according to one or more embodiments of the present invention co-uses the AM phase difference method.

The dual frequency CW and AM phase difference method of one or more embodiments of the present invention discussed above is applicable not only to the measuring apparatus 1 having the structure shown in FIG. 3, but also to other various apparatuses and systems. These systems refer to entire apparatuses constituted by a plurality of processing devices and processing units.

What is claimed is:

1. A measuring apparatus for measuring at least a distance from an object, comprising:
    a transmitting means for alternately modulating amplitudes of a first continuous wave having a first frequency and a second continuous wave having a second frequency,
        wherein the transmitting means modulates amplitudes for transmitting a transmission signal as a carrier wave using an AM signal;
    an AM producing means for producing the AM signal used for the amplitude modulation;
    a receiving means for receiving a reflection signal of the transmission signal transmitted from the transmitting means and reflected by the object to be measured as a receipt signal;
    a first distance calculating means for:
        detecting a phase difference between a first Doppler signal for the first continuous wave and a second Doppler signal for the second continuous wave from the receipt signal received by the receiving means, and
        calculating a distance from the object to be measured according to a first method using the detected phase difference;
    a second distance calculating means for:
        demodulating the receipt signal received by the receiving means into the AM signal,
        detecting a phase difference between the AM signal after demodulation and the AM signal produced from the AM producing means, and
        calculating a distance from the object to be measured according to a second method using the detected phase difference; and
    a determining means for determining a final distance measurement result based on the distance calculated by the first distance calculating means and the distance calculated by the second distance calculating means.

2. The measuring apparatus according to claim 1,
    wherein the first distance calculating means:
        further detects Doppler frequencies of the first Doppler signal and the second Doppler signal, and
        calculates a relative speed between the measuring apparatus and the object to be measured using at least one of the detected Doppler frequencies; and
    wherein the determining means:
        determines the final distance measurement result calculated by the second distance calculating means when the relative speed calculated by the first distance calculating means is less than or equal to a threshold value, and
        determines the final distance measurement result calculated by the first distance calculating means when the relative speed exceeds the threshold value.

3. The measuring apparatus according to claim 1, wherein the transmitting means:
    alternately and continuously modulates the amplitudes of the first continuous wave and the second continuous wave as a continuous carrier wave, and
    transmits the resulting signal as the transmission signal.

4. A method of for measuring at least a distance from an object, comprising the steps of:
    alternately modulating amplitudes of a first continuous wave having a first frequency and a second continuous wave having a second frequency for transmitting a transmission signal as a carrier wave using an AM signal;
    receiving a reflection signal of the transmission signal reflected by the object to be measured as a receipt signal;
    detecting a phase difference between a first Doppler signal for the first continuous wave and a second Doppler signal for the second continuous wave from the receipt signal,
    calculating a distance from the object to be measured according to a first method using the detected phase difference;
    demodulating the receipt signal into the AM signal,
    detecting a phase difference between the AM signal after demodulation and the AM signal used for the amplitude modulation,
    calculating a distance from the object to be measured according to a second method using the detected phase difference; and
    determining a final distance measurement result based on the distance calculated by the first method and the distance calculated by the second method.

* * * * *